Figure 1:
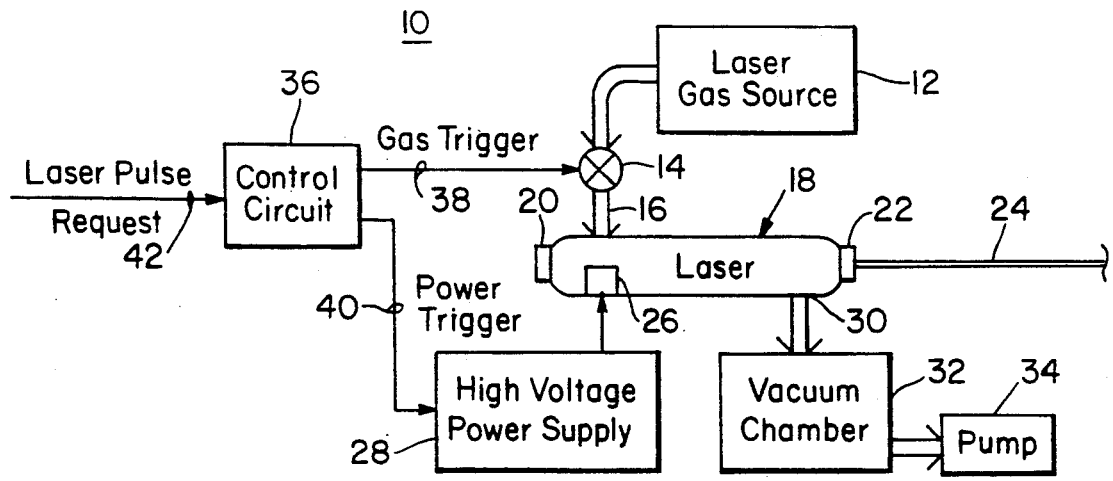

United States Patent [19]

Rudko

[11] Patent Number: 5,109,388
[45] Date of Patent: Apr. 28, 1992

[54] LONG PULSE, FAST FLOW LASER SYSTEM AND METHOD

[75] Inventor: Robert I. Rudko, Holliston, Mass.

[73] Assignee: Laser Engineering, Inc., Milford, Mass.

[21] Appl. No.: 586,885

[22] Filed: Sep. 24, 1990

[51] Int. Cl.$^5$ .................................. H01S 3/22
[52] U.S. Cl. .......................... 372/58; 372/59; 372/81
[58] Field of Search ............. 372/58, 59, 57, 90, 372/81, 83, 55

[56] References Cited

U.S. PATENT DOCUMENTS

| | | | |
|---|---|---|---|
| 3,577,096 | 5/1971 | Bridges et al. | 372/83 |
| 3,760,294 | 9/1973 | Roberts et al. | 372/90 |
| 4,317,087 | 2/1982 | Sander et al. | 372/57 |
| 4,360,922 | 11/1982 | Kulkarny | 372/59 |
| 4,488,310 | 12/1984 | McLeary et al. | 372/58 |
| 4,507,786 | 3/1985 | Dezenberg et al. | 372/33 |
| 4,817,111 | 3/1989 | Nilsen et al. | 372/58 |

Primary Examiner—William L. Sikes
Assistant Examiner—Galen J. Hansen
Attorney, Agent, or Firm—Iandiorio & Dingman

[57] ABSTRACT

A long pulse, fast flow laser system and method in which a laser having a gas inlet and a gas outlet and electrical discharge electrodes has its inlet connected through a valve to a source of laser gas and its outlet connected to a vacuum. A control circuit opens the valve upon a request for laser firing. The valve permits the laser gas to flow through the laser to the vacuum at high speed. A high-voltage power supply is triggered, creating an electrical discharge across the electrodes. After the end of the laser pulse, the valve is shut to cut off the flow of laser gas and the vacuum is reconstituted.

3 Claims, 1 Drawing Sheet

LONG PULSE, FAST FLOW LASER SYSTEM AND METHOD

FIELD OF INVENTION

This invention relates to a long pulse, fast flow laser system and method, and more particularly to such a laser system and method which uses a vacuum assist to create intermittent fast flow conditions for generating long laser pulses.

RELATED CASES

This application is related to and incorporates herein by reference the following applications having common inventors and assignee and all filed on Sept. 24, 1990:

"Heart-Synchronized Pulsed Laser System", by Robert I. Rudko and Stephen J. Linhares Ser. No. 07/586,951;

"Handpiece for Transmyocardial Vascularization Heart-Synchronized Pulsed Laser System", by Robert I. Rudko Ser. No. 07/586,891; and "Heart-Synchronized Vacuum-Assisted Pulsed Laser System and Method", by Robert I. Rudko Ser. No. 07/586,884.

BACKGROUND OF INVENTION

Lasers normally have three energy states: the ground state, the upper energy state and the lower energy state. The output power of the laser is proportional to the ratio of the molecule population in the upper state to the population in the lower state. That is, the greater the population inversion the greater the gain and the higher the power output of the laser. The population of the upper state is a function of the pumping of the laser, whereas the population of the lower state is a function of the temperature of the gas. The laser is driven by pumping ground state molecules into the upper state to increase the population inversion ratio. However, when this is done the associated heat drives some molecules from the ground state to the lower state, thereby decreasing the population inversion ratio. Eventually the laser saturates and no increase in output power occurs in response to further increases in pumping power.

One approach to overcome this problem is to pump with very short electrical pulses so that the population of the upper state increases before the heating effect drives a significant population from ground to the lower laser state, thus significantly increasing the population inversion. This achieves laser output pulses up to ten times the power of continuous operation.

An alternative way to create this pulsed effect in a continuous laser is to maintain a continuous electrical discharge in the laser but flow the gas through the discharge region at such a velocity that the gas is only in the discharge region for a short time: the time of the desired pulse width which pumps but does not heat equivalently and so increases the population inversion. While each volume of gas responds as if pulsed, the effect is in fact a continuous laser with ten times the power of slow flow or of a sealed laser.

However, to obtain such high-speed gas flow a high-speed gas pump and a heat exchanger capable of cooling the gas are required. These are expensive, large, noisy, and consume substantial power. But this is a preferred approach in many medium and low-speed pulsed laser systems.

In some applications, pulses of longer duration are required which are too long to obtain the energy conversion without heating the gas and thus decreasing the population inversion ratio yet are not long enough to require continuous high speed gas flow. Thus it is inefficient and expensive to maintain the high-speed pump and heat exchanger continuously for these applications.

SUMMARY OF INVENTION

It is therefore an object of this invention to provide an improved long pulse, fast flow laser system with substantially increased power output at reduced cost.

It is a further object of this invention to provide such an improved long pulse, fast flow laser system which is simpler, uses fewer components and is easier and less expensive to build and maintain.

It is a further object of this invention to provide such an improved long pulse, fast flow laser system which is smaller, more compact and lower in weight.

It is a further object of this invention to provide such an improved long pulse, fast flow laser system which achieves the high-power laser output of an electrically pulsed or fast flow continuous output laser unit without the attendant cost and complexity associated with such units.

The invention results from the realization that a long pulse, low duty cycle laser can be constructed having the increased power output of a fast flow pulsed laser without the need for expensive pumps and heat exchangers by providing the fast flow only intermittently in conjunction with the pulse period using a vacuum storage technique which builds up a vacuum during the off-time and applies that vacuum to drive the gas flow through the laser at high speed during the pulse time. It should be understood that throughout the specification and claims the term "vacuum" is used as a shorthand expression to refer simply to the negative pressure condition and not necessarily a perfect or nearly perfect vacuum: significant negative pressure is sufficient.

This invention features a long pulse, fast flow laser system including a laser having a gas inlet, a gas outlet and electrical discharge electrodes. There are valve means for interconnecting the laser inlet and a source of laser gas. A vacuum storage means is connected to the laser outlet for building a vacuum at a predetermined level during the pulse off-time. There is a high-voltage power supply and control means including means for opening the valve means and enabling the laser gas to be drawn from the source of laser gas through the laser and into the vacuum storage means at high speed during the pulse period, and for closing the valve means to cease the gas flow and enable the vacuum to rebuild after the laser has been fired. The means for controlling also includes means for operating the high-voltage power supply to energize the laser while the laser gas is flowing at high speed through the laser in order to produce a high-power, long laser pulse.

In a preferred embodiment the vacuum storage means may include a vacuum storage chamber and a low-speed pump for evacuating the chamber.

The invention also features a method of producing a long pulse fast flow laser output including applying a vacuum to the gas outlet of a laser, introducing a laser gas to the gas inlet of the laser, and supplying a laser firing pulse to the laser while the gas is flowing through the laser from the gas inlet to the vacuum at the gas outlet. The gas flow to the laser is then stopped at the end of the firing pulse and the vacuum is rebuilt.

DISCLOSURE OF PREFERRED EMBODIMENT

Other objects, features and advantages will occur to those skilled in the art from the following description of a preferred embodiment and the accompanying drawings, in which:

FIG. 1 is a block diagram of a long pulse, fast flow laser system according to this invention; and FIGS. 2a through 2e shows a timing diagram illustrating certain waveforms that occur in the operation of the system of FIG. 1.

The invention may be accomplished in a long pulse, fast flow laser system which includes a laser having a gas inlet, a gas outlet and electrical discharge electrodes. A typical pulse may be in a range of 1-500 milliseconds with gas speeds of greater than 200 miles/second, and electrical discharge to the electrodes on the order of 75 milliamps. There is a source of laser gas such as helium, carbon dioxide and nitrogen obtainable from Matheson Company, and valve means such as a solenoid valve for interconnecting the laser inlet and the source of laser gas. Vacuum storage means are connected to the laser outlet for building a vacuum at a predetermined level during the pulse off-time of the system. The vacuum is typically on the order of 50 mm mercury, the pulse has a duration of 0.1 second, and the pulse off-time a duration of 20 seconds. There is a high voltage power supply which provides power output of 100 milliamps at 15 Kvolts. A control means such as a trigger which can be operated by a laser pulse request signal from a computer or other associated equipment includes means for opening the valve and enabling the laser gas to be drawn from the source of laser gas through the laser and into the vacuum storage means at high speed during the pulse period, and for closing the valve means to cease the gas flow and enable the vacuum to rebuild after the laser has been fired. The source of laser gas may be pressurized at a level for example of 60 psi. The vacuum storage may include a vacuum storage chamber and a low-speed pump which operates continuously, whether the valve is open or closed, to evacuate the chamber, and is effective to build the vacuum when the valve is closed during the pulse off-time between the intermittent pulses.

The invention is also accomplished in the execution of the method of producing a long pulse, fast flow laser output which includes the steps of applying a vacuum to the gas outlet of a laser, introducing laser gas to the gas inlet of the laser, and applying a laser firing pulse to the laser while the gas is flowing through the laser from the gas inlet to the vacuum at the gas outlet. Subsequently the gas flow to the laser is stopped after the end of the firing pulse and the vacuum is rebuilt in readiness for the next cycle of operation.

There is shown in FIG. 1 a long pulse, fast flow laser system 10 according to this invention. Laser gas source 12 output is directed through solenoid valve 14 to the inlet 16 of laser 18. Laser 18 includes a totally reflecting mirror 20 and a partially transmitting mirror 22, through which the laser beam 24 is emitted. Laser discharge electrodes 26 are operated by high voltage power supply 28. Gas outlet 30 of laser 18 is connected to a vacuum storage device which includes vacuum chamber 32 and an evacuating pump 34. The pump runs continuously to evacuate chamber 32. The entire system is operated by control circuit 36, which provides a gas trigger signal on line 38 to open solenoid valve 14 and a power trigger signal on line 40 which causes high voltage power supply 28 to energize electrodes 26 and fire laser 18, creating laser beam 24. The gas trigger signal on line 38 and the power trigger signal on line 40 are generated by control circuit 36 which uses conventional circuits to develop trigger signals in response to a laser pulse request signal on line 42. Such a request signal can be directed from a computer or any other associated equipment which requires the firing of the laser.

Figure 2A:
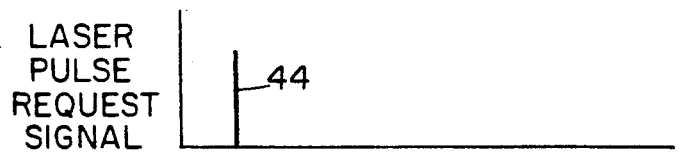
Figure 2B:
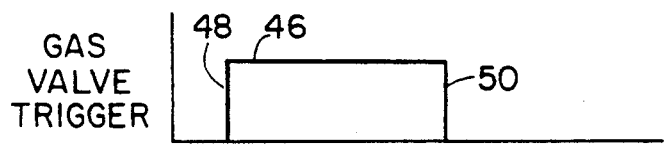

In operation the system may be be better understood with respect to the waveforms shown in FIGS. 2a through e, where the laser pulse request signal 44, as shown in FIG. 2a, which occurs on line 42 inaugurates the gas valve trigger signal 46, as shown in FIG. 2b, whose leading edge 48 opens valve 14 to connect the laser gas from source 12 through laser 18 to the vacuum in chamber 32 through laser 18. The lagging edge 50 of gas valve trigger signal 46, as shown in FIG. 2b, shuts valve 14, cutting off the flow of laser gas from source 12 to laser 18, and permits the vacuum in chamber 32 to be reconstructed by pump 34. While valve 14 is open during the duration of gas valve trigger signal 46, gas pressure in laser 18 builds up along path 48.

Figure 2C:
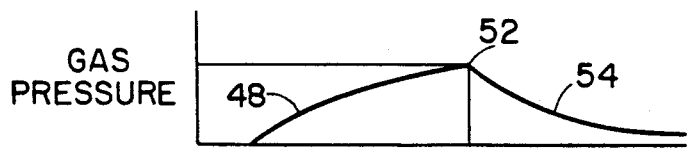
Figure 2D:
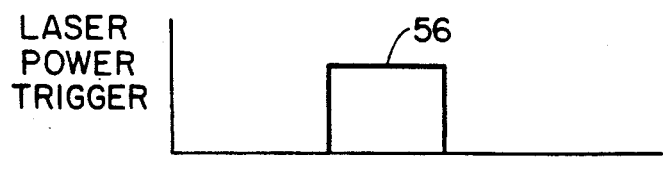
Figure 2E:
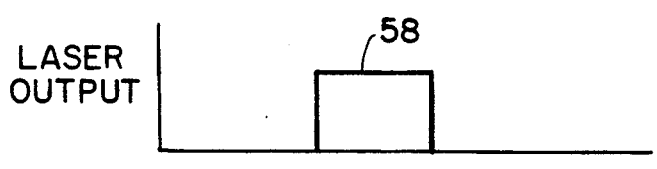

When the gas valve 14 is once again closed by the edge 50 of gas valve trigger signal 46, gas pressure stops building at the level of point 52, as shown in FIG. 2c, and the pressure descends along path 54. Sometime after the opening of valve 14 during the pressure buildup along path 48, laserpower trigger signal 56, as shown in FIG. 2d, is provided on line 40 to high voltage power supply 28. This signal energizes electrodes 26 and fires laser 18 to produce laser beam 24 whose output is depicted as pulse 58, FIG. 2e, which is coincident in time with the laser power trigger signal 56.

Control circuit 36 may be simply a standard microcontroller which in response to an external request signal generates control signals delayed with selected delays between the signals.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A long pulse, fast flow gas laser system comprising:
a gas laser including a laser gas, having a laser gas inlet and a laser gas outlet;
valve means for interconnecting said laser gas inlet to a source of said laser gas;
vacuum storage means including a vacuum storage chamber connected to said laser gas outlet for building a vacuum within said vacuum storage chamber at a predetermined level;
a high voltage power supply;
control means including:
means for opening and closing said valve means, enabling said laser gas to be drawn from the source of laser gas through said laser and into said vacuum storage means at high speed while said valve means is opened and said laser is fired for a period of pulse-on time, and to cease the gas flow and enable the vacuum to rebuild for a period of pulse-off time after said laser has been fired; and
means for operating said high voltage power supply to energize said laser gas for said pulse-on time while said laser gas is flowing through the laser to produce a high power, long laser pulse.

2. The long pulse, fast flow gas laser system of claim 1 in which said vcuum storagemeans includes a low speed pump for evacuating said chamber.

3. A method producing a long pulse, fast flow gas laser output comprising the steps of:
   a. building a vacuum to a predetermined level within a vacuum storage chamber connected to the laser gas outlet of a gas laser;
   b. introducing laser gas to the laser gas inlet of the laser;
   c. supplying a laser firingpulse to the laser for a period of pulse-on time while the laser gas is flowing through the laser from the laser gas inlet to the vacuum storage chamber at the laser gas outlet;
   d. stopping the gas flow to the laser at the end of the firing pulse;
   e. rebuilding the vacuum in the vacuum storage chamber after the firing pulse for a period of pulse-off time.

* * * * *